United States Patent [19]
Norell

[11] 3,878,255
[45] Apr. 15, 1975

[54] PROCESS FOR PREPARING 3,5-DIALKYL PHENOLS

[75] Inventor: John R. Norell, Bartlesville, Okla.

[73] Assignee: Phillips Petroleum Company, Bartlesville, Okla.

[22] Filed: June 5, 1972

[21] Appl. No.: 259,561

[52] U.S. Cl....... 260/624 R; 260/621 D; 260/624 E
[51] Int. Cl... C07c 37/14; C07c 37/16; C07c 37/18
[58] Field of Search........ 260/621 D, 624 C, 624 E, 260/626 R, 624 R

[56] References Cited
UNITED STATES PATENTS
3,349,144   10/1967   Alul et al.................... 260/624 C X

*Primary Examiner*—Leon Zitver
*Assistant Examiner*—Norman Morgenstern

[57] ABSTRACT

A process for preparing 3,5-dialkyl phenols is provided. In one embodiment an ortho-, para-, or meta-monoalkyl phenol is caused to isomerize and/or disproportionate to the 3,5-dialkyl phenol in reaction medium comprising liquid hydrogen fluoride. In another embodiment the 3,5-dialkyl phenol is obtained by contacting phenol with an alkylating agent selected from tertiary alcohols, tertiary alkyl halides, and olefins in a reaction medium comprising liquid hydrogen fluoride.

4 Claims, No Drawings

PROCESS FOR PREPARING 3,5-DIALKY PHENOLS

BACKGROUND OF THE INVENTION

In one aspect, this invention relates to a process for isomerizing and/or disproportionating alkyl phenols. In yet another aspect, this invention relates to a process for alkylating phenols.

Heretofore, 3,5-dialkyl phenols have not been readily obtained. The prior art procedures normally involve inconvenient, multi-step processes. One such process is described in U.S. Pat. No. 3,308,165. Another such process is described in the *Canadian Journal of Chemistry*, 41, 1653 (1963).

Although it is known in the prior art that phenol can be alkylated directly, no successful alkylation resulting in 3,5-dialkyl phenol has been reported. However, the isomerization and transalkylation of tert-butylphenols on Type Y Zeolite catalysts to a mixture of dialkyl phenols in which the 3,5-dialkyl phenol predominates has been reported by Bolton, et al, in *J. Org. Chem.*, 33, 3415 (1968).

SUMMARY OF THE INVENTION

It is an object of this invention to provide 3,5-dialkyl phenols by an improved process.

In accordance with the object of this invention, it has been found that a 3,5-dialkyl phenol can be obtained by isomerizing and/or disproportionating an ortho-, meta-, or para-substituted monoalkyl phenol in a reaction medium comprising liquid hydrogen fluoride.

Further in accordance with this invention, it has been found that a 3,5-dialkyl phenol can be obtained by contacting phenol with an alkylating agent selected from tertiary alcohols, tertiary alkyl halides and olefins in a reaction medium comprising liquid hydrogen fluoride.

DESCRIPTION OF THE PREFERRED EMBODIMENT

According to one presently preferred embodiment of this invention, 3,5-dialkyl phenols can be obtained by contacting a monoalkyl phenol in a reaction medium comprising liquid hydrogen fluoride. The monoalkyl phenol undergoes isomerization and/or disproportionation to the desired 3,5-dialkyl phenol.

The monoalkyl phenols suitable for use in this invention can be either the ortho-, meta-, or para-isomers of the alkyl phenol. Best yields are obtained using alkyl phenols having a tertiary carbon atom attached to the aromatic ring. For that reason, tertiary alkyl phenols are preferred.

Generally speaking, any tertiary alkyl phenol will be suitable. However, the lower tertiary alkyl phenols of the formula

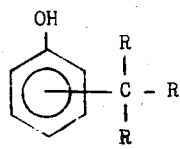

wherein each R of the substituent grouping can be the same or different and is selected from straight and branched chain alkyl groups and the total number of carbon atoms in the substituent grouping is from 4 – 8. Suitable monoalkyl phenols include the following: 4-tert-butylphenol, 3-tert-butylphenol, 2-tertbutylphenol, 4-tert-amyl phenol, 3-(1,1-diethylbutyl)phenol, 2-(1-methyl-1-ethylbutyl)phenol, 4-(1-methyl-1-ethylpropyl)phenol, 3-(1-methyl-1-ethylpropyl)-phenol, 4-(1,2-dimethyl-1-ethylpropyl)phenol, 3-(1,2-dimethyl-1-ethylpropyl)-phenol.

According to this embodiment, the monoalkyl phenol disproportionates by transalkylation to the 3,5-dialkyl phenol according to the following scheme.

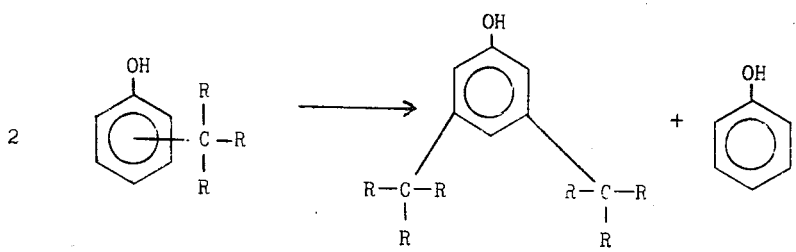

The isomerization-disproportionation can be carried out by dissolving the monoalkyl phenol in liquid hydrogen fluoride. The amount of hydrogen fluoride relative to the amount of monoalkyl phenol may vary over a wide range. Sufficient hydrogen fluoride should be employed to dissolve the phenol and maintain the reaction mixture in a liquid state until reaction is complete. Normally a mole ratio of hydrogen fluoride to monoalkyl phenol varying over the range 5:1 to 100:1 will be suitable. It is preferred, however, to use a mole ratio varying over the range from 15:1 to 50:1.

If desired, a cosolvent can be employed. Normally however, this is not preferred except in those cases when the mole ratio of hydrogen fluoride to monoalkyl phenol is less than about 15:1. Solvents which can be employed in this manner should be stable in the presence of liquid hydrogen fluoride. One such suitable solvent is sulfur dioxide.

The reaction may be conducted over a wide temperature range. However, below about −40°C reaction rates may be relatively low. Above about 100°C the phenol reactant and products are degraded by hydrogen fluoride. Therefore, it is preferred to conduct the reaction at an intermediate temperature range varying from about 0°C to 80°C.

The reaction should be conducted in a liquid phase. If necessary, the reaction can be run in a pressurized reactor at a pressure sufficient to maintain the reactants in the liquid state. The selection of a suitable reactor and pressure conditions is considered to be well within the skill of one in the art.

The reaction time can vary according to the nature of the reactants, temperature and other reaction variables. Normally, 5 minutes to 24 hours will be suitable. In most cases a reaction time of 15 minutes to 6 hours will insure the desired conversion.

In order to demonstrate the operability of the invention, the three tert-butylphenols were treated with liquid hydrogen fluoride. Referring to Table I, there is shown the effect of contacting ortho-, meta-, and para-tert-butylphenol with liquid hydrogen fluoride over a wide temperature range.

TABLE I tert-BUTYLPHENOL ISOMERIZATION[1]

| Run | tert-Butylphenol | Temp., °C | % Recovery of Phenols | Heavies, % | Phenolic Distribution | | | Distribution of Mono-TBP | | |
|---|---|---|---|---|---|---|---|---|---|---|
| | | | | | Phenol | Mono-t-Bu | Di-t-Bu[3] | ortho | meta | para |
| 1 | ortho | −75 | 90+ | 0 | 2.4 | 91.8 | 5.8 | 97.4 | 0 | 2.4 |
| 2 | " | −40 | 90+ | 0 | 2.9 | 97.1 | 0 | 0 | 0 | 100 |
| 3 | " | −5 | 90+ | tr. | 10.4 | 77.1 | 12.5 | 0 | 19.4 | 80.6 |
| 4 | " | 30 | 86 | 3 | 23.8 | 23.6 | 52.6 | 0 | 86.0 | 14.0 |
| 5 | " | 55 | 69 | 8 | 31.9 | 24.2 | 46.6 | 0.9 | 79.6 | 19.4 |
| 6 | " | 75 | 68 | 19 | 42.4 | 24.9 | 32.7 | 6.4 | 73.8 | 19.7 |
| 7 | " | 100 | 43 | 41 | 89.4 | 8.3 | 2.3 | 27.0[2] | 73.0[2] | 0 |
| 8 | meta[4] | −75 | 90+ | 0 | 0 | 100 | 0 | 0 | 91.0 | 9.0 |
| 9 | " | −40 | 90+ | 0 | 2.6 | 97.4 | 0 | 0 | 96.7 | 3.3 |
| 10 | " | −5 | 90+ | 0 | 4.9 | 86.9 | 8.1 | 0 | 96.7 | 3.3 |
| 11 | " | 30 | 87 | tr. | 11.5 | 61.6 | 26.9 | 0 | 98.2 | 1.8 |
| 12 | " | 55 | 81 | 3 | 24.8 | 18.2 | 57.0 | 0 | 86.3 | 13.7 |
| 13 | " | 75 | 77 | 11 | 29.9 | 19.4 | 42.1 | 0 | 83.0 | 17.0 |
| 14 | " | 100 | 51 | 28 | 100 | tr. | 0 | 0 | 52.9[2] | 47.1[2] |
| 15 | para | −75 | 90+ | 0 | 0 | 100 | 0 | 0 | 0 | 100 |
| 16 | " | −40 | 90+ | 0 | 1.9 | 97.8 | 0.2 | 0 | 0 | 100 |
| 17 | " | −5 | 90+ | tr. | 8.7 | 77.0 | 14.2 | 0 | 18.3 | 81.7 |
| 18 | " | 30 | 73 | 22 | 25.6 | 22.1 | 52.3 | 0 | 86.0 | 14.0 |
| 19 | " | 55 | 61 | 30 | 36.9 | 22.1 | 41.0 | 1.5 | 84.1 | 14.4 |
| 20 | " | 75 | 57 | 35 | 45.2 | 22.4 | 32.4 | 2.7 | 80.4 | 17.0 |
| 21 | " | 100 | 54 | 22 | 88.2 | 11.7 | 0 | 74.5[2] | 0 | 25.5[2] |

[1]All runs were made with 15 grams of tert-butylphenol in 100 ml HF for 2 hours.
[2]If the amount of mono-tert-BuPhOH is low, the distribution of ortho-meta-para is probably meaningless.
[3]The dialkylated phenol is chiefly the 3,5-isomer.
[4]Starting purity of meta-tert-butylphenol was 91 per cent meta and 9 per cent para.

It can be readily seen that all three isomers of tert-butyl phenol can be converted to 3,5-di-tert-butyl phenol according to the process of this invention (see runs 3–7, 10–13 and 17–20). At a temperature of about −40°C or below, low or no conversion of the starting phenol to 3,5-di-tert-butyl phenol occurs (see runs 1, 2, 8, 9, 15 and 16). At a temperature of about 100°C, the recovery of phenolic materials is significantly reduced.

From these data it appears that the ortho- and para-isomers are first isomerized to the meta-isomer which disproportionates by a transalkylation reaction to form the 3,5-isomer (see runs 4 and 18).

In another embodiment of this invention, 3,5-dialkyl phenols are obtained by contacting phenol with an alkylating agent selected from tertiary alcohols, tertiary alkyl halides and olefins in a reaction medium comprising liquid hydrogen fluoride. If an olefin is employed as the alkylating agent, it is preferred that it be capable of forming a tertiary carbonium ion in the presence of hydrogen fluoride.

Preferred alkanols and alkyl halides have the formula

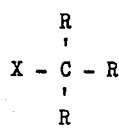

wherein X can be OH or a halogen selected from F, Cl, Br or I. Each R can be the same or different and is selected from straight or branched chain alkyl groups and the total number of carbon atoms in the alkanol or alkyl halide is from 4–8. Suitable tertiary alcohols and tertiary alkyl halides include the following: tert-butyl alcohol, tert-butyl chloride, tert-amyl alcohol, tert-amyl bromide, 3-methyl-3-pentanol, 3-methyl-3-bromopentane, 3-methyl-3-heptanol, 3-methyl-3-iodoheptane, 3-ethyl-3-pentanol, 3-ethyl-3-chloropentane, tert-amyl iodide, 3-isopropyl-3-pentanol, 3,5-dimethyl-3-hexanol, 3,5-dimethyl-3-bromohexane, 3-isopropyl-3-chloropentane, tert-butyl fluoride, tert-amyl fluoride, and the like.

Preferred olefin alkylating agents have the formula

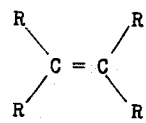

wherein each R is selected from hydrogen or straight and branched chain alkyl groups and the total number of carbon atoms in the olefin is from 4–8. At least two R groups on one olefinic carbon must be alkyl. Suitable olefins include the following: isobutylene, diisobutylene, 2-methyl-2-butene, 2-methyl-2-pentene, 2,3-dimethyl-2-butene, 3,4-dimethyl-3-hexene, 3-methyl-3-heptene, 4-methyl-3-heptene and the like.

According to this embodiment, there are obtained 3,5-dialkyl phenols of the formula

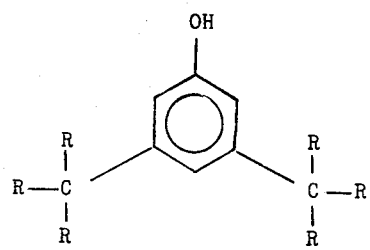

wherein R is defined as above.

The mole ratio of alkylating agent to phenol can vary over a wide range. Generally, a ratio varying over the range from about 1:1 to 5:1 will be suitable. It is preferred to use a mole ratio varying from about 1.5:1 to 3:1.

The amount of hydrogen fluoride employed in the reaction medium can vary over a wide range. Generally, it will also be used as the reaction solvent. A mole ratio of hydrogen fluoride to phenol varying over the range 5:1 to 100:1 will normally be suitable. It is preferred to use a mole ratio varying over the range 15:1 to 50:1.

At low ratios of hydrogen fluoride to phenol, cosolvents not reactive towards hydrogen fluoride can be employed. One such solvent is sulfur dioxide. However, it is preferred to use hydrogen fluoride as the only solvent.

The reaction can be conducted over a wide temperature range. Suitable temperatures may vary from −80°C to +80°C. Below about −40°C, reaction rates are relatively low, but alkylation does occur. The mixture can then be warmed to a temperature where the disproportionation can occur. When the temperature is above about 100°C, degradation of the phenolic materials occurs and for that reason it is preferred not to exceed about 80°C. When the alkylating agent is an olefin, it is preferred to admix the reactants below 0°C and allow them to warm above 0°C. This minimizes the formation of heavy side products resulting from the olefin undergoing polymerization.

When the reaction temperature is to be maintained at a temperature above the atmospheric boiling point of hydrogen fluoride, the reaction should be conducted in a suitable pressurized vessel in order to maintain the reactants in the liquid phase.

The reaction can be conducted for any period of time which will insure substantially complete reaction. This will vary according to the nature of the alkylating agent, the mole ratios of reactants, temperature of the reaction and other variables. Usually 5 minutes to 24 hours will be satisfactory. In most cases, 15 minutes to 6 hours will be sufficient.

In a variation of this method, the alkylating agent and phenol can be first contacted with an amount of hydrogen fluoride which will catalyze alkylation but not isomerization-disproportionation. A mole ratio of hydrogen fluoride to phenol varying over the range from about 0.1:1 to 2:1 will be sufficient for this purpose. This catalytic alkylation is normally done by mixing the ingredients at −78°C. During the course of the alkylation the temperature can be allowed to warm to about 25°C. When alkylation is complete there will be normally a mixture of ortho- and para-substituted alkyl phenols. The temperature is then lowered (to about −78°C) and additional hydrogen fluoride added to effect the isomerization and/or disproportionation. The additional hydrogen fluoride will be an amount sufficient to bring it into the range where isomerization and disproportionation occurs. From this point the reaction is run just as in the prior description of this embodiment.

In yet another alternative method, a meta- substituted alkyl phenol can be contacted with an alkylating agent in the presence of the hydrogen fluoride solvent. Utilization of meta-alkyl phenol feedstock has the advantage of minimizing olefin polymerization during the course of the conversion to the 3,5-dialkyl phenol.

Referring now to Table II, there is provided a summary of reaction runs involving the alkylation of phenol in the presence of hydrogen fluoride in order to obtain the 3,5-dialkyl phenol.

The runs in Table II were conducted by varying a variety of reaction parameters. It can be seen from the Table that the reactants may be admixed in any convenient order (see runs 7 and 11). By comparing runs 6 and 7 the effect of temperature can be seen. In run number 6 wherein the contacting occurred at −78°C, alkylation occurred but no 3,5-di-tert-butyl phenol was formed. However, in run number 7 wherein the temperature was allowed to increase from −78°C to 55°C an appreciable amount of 3,5-di-tert-butyl phenol was formed. This is noted in other reaction runs throughout the Table, e.g., runs 5, 10 and 11.

Runs 12 and 13 show the effect of using tert-butanol or tert-butyl chloride as the alkylating agent rather than an olefin such as isobutylene. The use of these agents has the advantage that unlike an olefin, they do not polymerize as extensively in liquid hydrogen fluoride.

Runs 8 and 9 show the effect of using only a limited amount of hydrogen fluoride. As can be seen, alkylation occurs but no 3,5-dialkyl phenol was detectable in

TABLE II.—ALKYLATION OF PHENOLS

| Run No. | 1. Phenol | | 2. Isobutylene | | 3. HF | | Order of addition | Temp., °C. | Time, hr. | Crude wt. | Product distribution [a] | | | | | Percent heavies |
|---|---|---|---|---|---|---|---|---|---|---|---|---|---|---|---|---|
| | G. | Mole | G. | Mole | G. | Mole | | | | | Phenol | Meta-TBP | Para-TBP | 3,5-Di-TBP | 2,4-Di-TBP | |
| 1 [d] | 18.8 | 0.20 | 26.0 | 0.23 | 100 | 5.0 | 1,3,2 | 0 | 2 | 38.6 | 4.1 | 9.0 | 51.0 | 16.4 | 2.4 | 17.1 |
| 2 [e] | 12.0 | 0.13 | 30.0 | 0.54 | 100 | 5.0 | 1,3,2 | 25 | 3 | 32.7 | 42.6 | 34.0 | 21.6 | 1.8 | | (b) |
| 3 | 18.8 | 0.20 | 33.0 | 0.59 | 100 | 5.0 | 1,3,2 | −70 | 2 | 40.1 | Trace | 0 | 62.8 | 0 | 36.2 | 1.0 |
| 4 [f] | 18.8 | 0.20 | 36.0 | 0.64 | 100 | 5.0 | 1,3,2 | −70 | 0.7 | 47.0 | 0.6 | 0 | 35.4 | 0 | 64.0 | (b) |
| 5 [g] | 15.0 | 0.16 | 25.0 | 0.45 | 100 | 5.0 | 1,3,2 | −70→25 | 2 | 32.1 | 25.1 | 12.0 | 43.4 | 10.4 | | 9.2 |
| 6 [h] | 18.8 | 0.20 | 33.0 | 0.59 | 130 | 6.5 | 3,2,1 | −78 | 2 | 44.5 | 3.4 | | 70.6 | | 15.2 | 10.8 |
| 7 [i] | 18.8 | 0.20 | 22.5 | 0.40 | 125 | 6.2 | 3,2,1 | −78→55 | 2 | 35.2 | 45.2 | 17.5 | 2.7 | 24.5 | | 10.1 |
| 8 [j] | 9.4 | 0.1 | 11.2 | 0.2 | 4 | 0.2 | 1,2,3 | 55-75 | 2 | 16.6 | Trace | 0.3 | 88.4 | | 9.0 | 2.2 |
| 9 [k] | 9.4 | 0.1 | 11.2 | 0.2 | 4.0 | 0.2 | 1,3,2 | 55 | 2 | 19.0 | Trace | | 58 | | 42 | Trace |
| 10 [l] | 9.4 | 0.1 | 11.2 | 0.2 | 104 | 5.2 | 1,3,2 | −78→25 | 2+ | 18.1 | 27.1 | 16.1 | 24.8 | 18.5 | 1.3 | 12.2 |
| 11 [m] | 15.0 | 0.16 | 11.2 | 0.20 | 104 | 5.2 | 1,3,2 | −78→25 | 3+ | 22.0 | 17.6 | 14.3 | 10.8 | 37.7 | | 19.8 |
| 12 [n] | 18.8 | 0.2 | 29.6 | 0.42 | 100 | 5.0 | 1,3,2 | 55 | 2 | 34.0 | 34.6 | 24.5 | 8.8 | 24.4 | | 7.7 |
| 13 [o] | 9.4 | 0.1 | [r] 18.5 (t-butanol) | 0.2 | 100 | 5.0 | 1,3,2 | 0 | 2 | 17.5 | 3.0 | 12.2 | 53.1 | 20.7 | | 11.0 |
| 14 [p] | 23.0 | 0.24 | 27.5 | 0.49 | 10 (Zeolon H) | | 1,3,2 | 150 | 2 | 38.5 | 29.7 | 7.9 | 40.3 | | 22.0 | Trace |
| 15 | 47.0 | 0.5 | 23.0 | 0.5 | 1.0 | .05 | | 61 | 3 | | 98.2 | | 1.8 | | | |
| 16 [q] | 47.0 | 0.5 | 68.5 | 1.22 | 1.0 | .0015 | | 65 | 3 | | | | 10.5 | | 55.5 | 34 |
| 17 [c] | 15.0 | 0.16 | 20.0 | 0.36 | 50.0 | 2.5 | | 30 | 1.25 | | 4.1 | 5.4 | 18.8 | 18.0 | | 53 |
| 18 | 15.0 (Meta-TBP) | 0.1 | 6.0 | 0.1 | 100 | 5.0 | 1,3,2 | 0 | 2 | 20.2 | 0 | 43.0 | 7.0 | 50.0 | | (b) |

[a] TBP represents tert-butylphenol.
[b] Percent heavies not determined.
[c] Contained 0.7 wt. percent unknown.
[d] C₄H₈ bubbled in over a 2-hour period.
[e] C₄H₈ bubbled in at 25° C. Product was shaken 2 hrs. with 10% NaOH and 30.8 g. of neutrals were obtained. Only 1.3 g. of phenols were recovered.
[f] C₄H₈ bubbled in over a period of ca. 1 hour.
[g] Reactants mixed at −78° and allowed to warm to 25° C
[h] A mixture of phenol in HE was added to a mixture of C₄H₈ in HF at −78° C.
[i] Run as above except warmed to 55° C.
[j] A mixture of C₄H₈ and HF was added to phenol. Product solidified.
[k] SO₂, 100 ml., was used as a solvent.
[l] Phenol and 4 ml. HF were mixed at −78° C., C₄H₈ was added and allowed to stand 1 hour, 100 ml. HF was added, stirred 1 hour at −78° C. then warmed to room temperature.
[m] The percent heavies as determined by internal standards. Phenol and 4 ml. HF were mixed at −78° C., C₄H₈ was added and the reactor was shaken at 25° C. for 1 hr. (Rapid exotherm at 25–45° C.) After cooling to −78° C, 100 ml. HF was added and the mixture was again warmed to 25° C. for 2 hrs.
[n] May be additional heavies present.
[o] May be additional heavies present.
[p] Benzene (50 ml.) solvent, pressure at 150° fell from 125→35 during reaction. The 7.9% ascribed could possibly be ortho-TBP.
[q] Catalyst was BF₃.
[r] Alkylating agent is t-butyl chloride.

the product mixture. It is to be noted that $SO_2$ was used as the solvent in run 9.

Runs 15 and 16 were conducted to demonstrate that prior art methods of alkylating phenol do not result in the 3,5-dialkyl phenol. It is reported by Habibi in U.S. Pat. No. 3,449,444 that dialkyl phenols can be obtained by alkylating phenol in the presence of boron trifluoride and similar catalysts. An examination of this reaction with isobutylene as the alkylating agent shows that a dialkyl phenol is formed but not 3,5-dialkyl phenol. In this case the dialkyl phenol formed is 2,4-di-tert-butyl phenol (Run 15). When hydrogen fluoride is used in a catalytic amount according to the conditions described in Habibi no dialkyl phenol is detectable (Run 16).

Run number 14 represents an attempt to use an acidic clay (Zeolon H) as the acidic component. However, no 3,5-di-tert-butyl phenol is formed although some 2,4-di-tert-butyl phenol was obtained.

Runs 10 and 11 demonstrate the effect of first contacting isobutylene and phenol with a limited amount of hydrogen fluoride, allowing alkylation to occur and then adding a solvent quantity of hydrogen fluoride for isomerization-disproportionation.

Run number 18 demonstrates the effect of contacting meta-tert-butylphenol with isobutylene in the presence of hydrogen fluoride. In this way, the best overall conversion to the 3,5-dialkyl phenol was obtained.

EXPERIMENTAL

Apparatus

All reactions above 0°C were carried out in a 300 ml Monel vessel equipped with a pressure gauge and Hoke valves. Heating and mixing were supplied by shaking the reactor in an Eberbach thermostated reciprocating shaking water bath. For reactions at or below 0°C, a polyethylene vessel was constructed (450 ml capacity) with two openings so that a thermometer could be inserted into the liquid. The reactor was placed in a coolant at the desired temperature and magnetically stirred.

General Procedure for Isomerization Reactions (Table I)

Standard Procedure for Reactions Above 0°C

The monoalkyl phenol was placed in a 300 ml Monel reactor cooled in ice under a $N_2$ flow. Liquid hydrogen fluoride was added, the reactor capped and placed in the shaker bath at the desired temperature. After the allotted time, the reactor was cooled, the valve opened and the HF bled off. The reactor was opened and the reaction mixture was poured on ice water, neutralized with $NaHCO_3$ and extracted with ether. After drying over $MgSO_4$-$K_2CO_3$ mixture, the extracts were concentrated to give a crude phenol mixture, which was analyzed by gas chromatographic techniques.

Standard Procedure for Reaction Below 0°C

The 450 ml Marlex polyethylene reactor containing liquid HF was cooled in a suitable coolant until the desired temperature was reached. The monoalkyl phenol was added and stirred magnetically for the allotted time. The entire mixture was poured on ice, neutralized with $NaHCO_3$ and extracted with ether. After drying, the extracts were concentrated to give a crude phenol mixture which was analyzed by gas chromatography.

General Procedure for Alkylation-Disproportionation Reactions (Table II)

The reactants were mixed in the order recorded in column 8 (Order of Addition) of Table II in either the Monel or polyethylene reactor. Isobutylene was usually added slowly through a Gilmont gas flowmeter in the gaseous phase. The reactor was then shaken or stirred for the alloted time at the specified temperature. The contents were poured on ice, ether extracted and the combined ether extracts were neutralized by shaking with saturated $NaHCO_3$ solution. After drying over $MgSO_4$, the product was concentrated and analyzed by gas chromatographic techniques.

The 3,5-dialkyl phenol can be isolated by techniques well known to those skilled in the art. Suitable techniques include distillation, recrystallization, sublimation, solvent extraction, and column chromatography.

The 3,5-dialkyl phenols that may be obtained according to this invention are useful in a variety of ways. For example, they are useful as antioxidants in gasolines, lubricating oils and synthetic polymers such as in synthetic rubbers. They are also useful in the preparation of phenol-aldehyde resins.

I claim:

1. A process for preparing 3,5-dialkyl phenols which comprises:
   a. forming a reaction mixture comprising phenol, an alkylating agent selected from the group consisting of (1) tertiary alkanols and tertiary alkyl halides having the formula

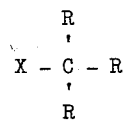

wherein X is selected from the group consisting of OH, Cl, Br or I and each R can be the same or different and is selected from straight or branch chain alkyl groups and a total number of carbon atoms in the alkanol or alkyl halide is from 4–8 and (2) olefins having the formula

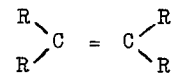

wherein each R is selected from hydrogen or straight and branch chain alkyl groups and the total number of carbon atoms in the olefin is from 4–8 with the further proviso that at least two R groups on one olefinic carbon must be alkyl, and liquid hydrogen fluoride as the reaction medium at a temperature of −78°C with a mole ratio of alkylating agent to phenol ranging from 1:1 to 5:1 and a mole ratio of hydrogen fluoride to phenol in the range 0.1:1 to 2:1, b. warming said reaction mixture to a temperature of about 25°C and allowing said phenol and said alkylating agent to react in said HF reaction medium to form a mixture of monoalkyl phenols,
   c. allowing the alkylation to proceed to completion and then lowering the temperature to about −78°C and adding sufficient additional hydrogen fluoride to the reaction mixture to cause isomerization and disproportionation of the mixture of monoalkyl phenols to the 3,5-dialkyl phenols,
   d. heating the reaction mixture obtained in step (c) to a temperature in the range of about 0°C to 80°C to obtain said 3,5-dialkyl phenols, and
   e. recovering 3,5-dialkyl phenols thus produced.

2. A process for preparing 3,5-dialkyl phenols which comprises the steps of:
   a. forming a liquid reaction mixture at a temperature below 0°C comprising phenol, an olefin alkylating agent having the formula

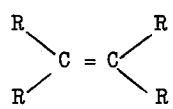

wherein each R is selected from hydrogen or straight and branch chain alkyl groups and the total number of carbon atoms in the olefin is from 4–8 with the further proviso that at least two R groups on one olefinic carbon must be alkyl, and solvent quantities of liquid hydrogen fluoride as the reaction medium with a mole ratio of alkylating agent to phenol ranging from 1:1 to 5:1 and a mole ratio of hydrogen fluoride to phenol ranging from 5:1 to 100:1 and b. warming the reaction mixture thus formed to a temperature above 0°C and allowing said phenol and said alkylating agent to react in said liquid hydrogen fluoride reaction medium at a temperature in the range of 0°C to 80°C and form 3,5-dialkyl phenols.

3. A process according to claim 2 wherein the alkylating agent is isobutylene.

4. A process for preparing 3,5-di-tert-butyl phenol which comprises:

a. forming a reaction mixture comprising phenol, isobutylene, and liquid hydrogen fluoride as the reaction medium at a temperature of −78°C with a mole ratio of isobutylene to phenol ranging from 1:1 to 5:1 and a mole ratio of hydrogen fluoride to phenol in the range 0.1:1 to 2:1, b. warming said reaction mixture to a temperature of about 25°C and allowing said phenol and said alkylating agent to react in said HF reaction medium to form a mixture of monoalkyl phenols, c. allowing the alkylation to proceed to completion and then lowering the temperature to about −78°C and adding additional hydrogen fluoride to the reaction mixture sufficient to cause isomerization and disproportionation of the mixture of monoalkyl phenols to the 3,5-di-tert-butyl phenol, d. heating the reaction mixture to a temperature in the range of about 0°C to 80°C to obtain said 3,5-di-tert-butyl phenol, e. recovering 3,5-di-tert-butyl phenol thus produced.

\* \* \* \* \*